Patented Aug. 6, 1946

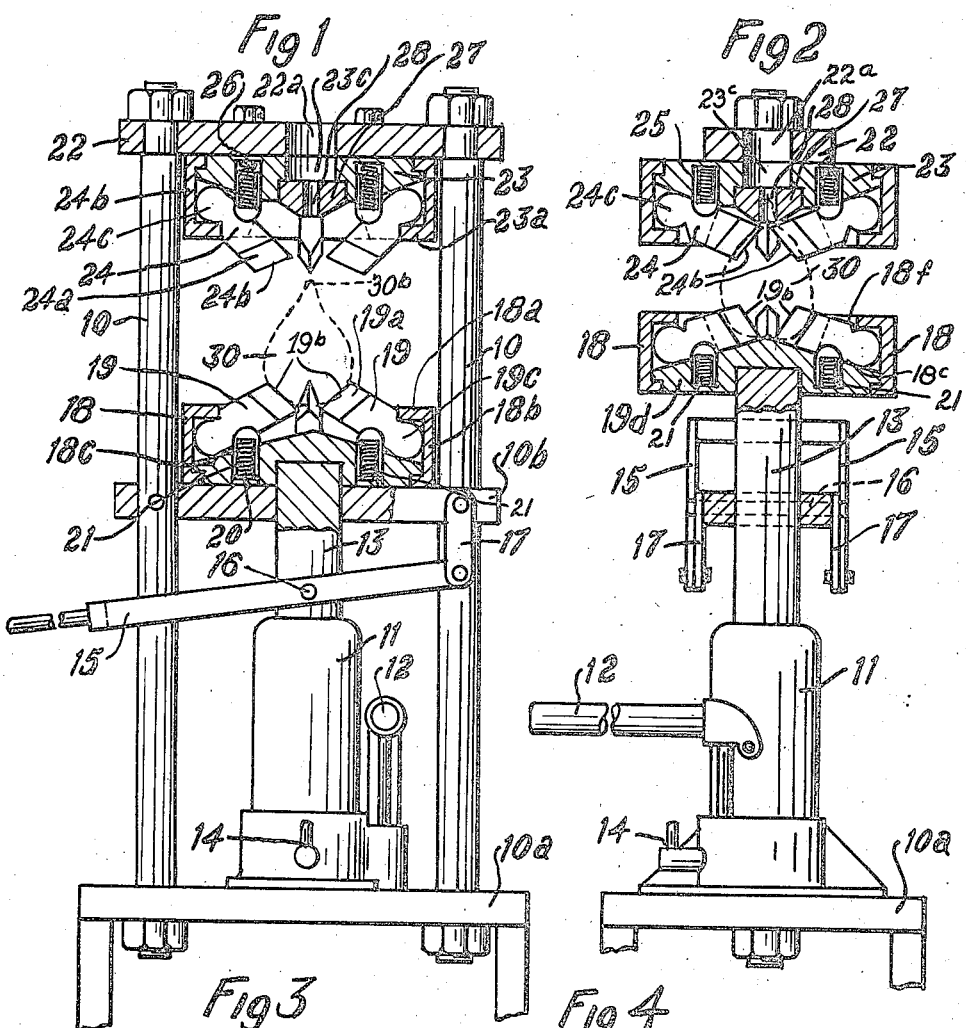

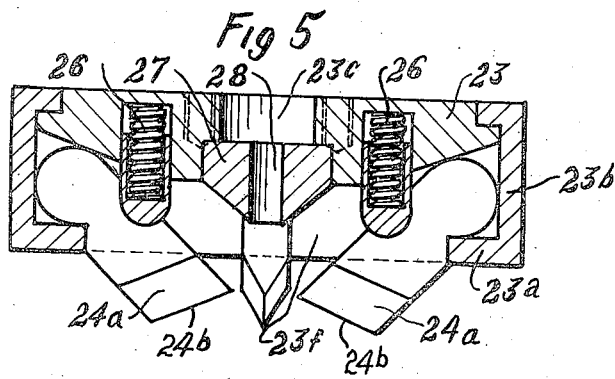
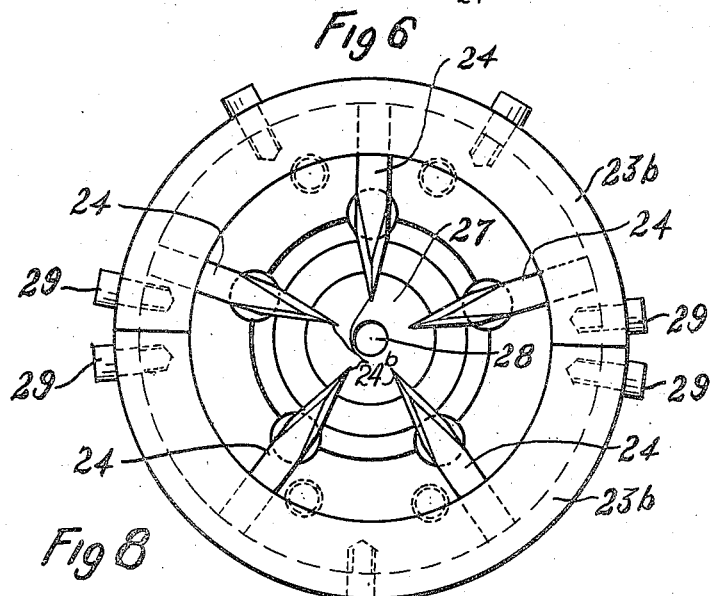
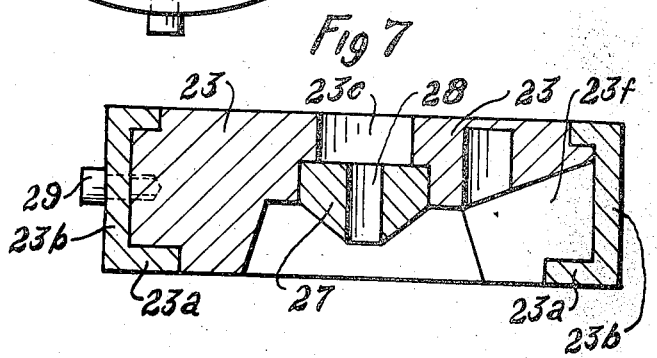

2,405,303

UNITED STATES PATENT OFFICE 2,405,303

APPARATUS FOR CRACKING NUTS

William F. Grupe, Lyndhurst, N. J., assignor to Brazil Babassu Corporation, New York, N. Y., a corporation of New York Application April 9, 1943, Serial No. 482,357

12 Claims. (Cl. 146—10)

My present invention relates to the apparatus for cracking nuts.

More particularly, the invention relates to the apparatus for cracking nuts of the character of babassu palm nuts. Babassu nuts generally are composed of pericarp, mesocarp and endocarp. The pericarp is a fibrous structure which is tough and resistant, whereas the mesocarp is amorphous and relatively soft. In the babassu palm nuts and nuts of this character the blossom end of the nut is largely of pericarp formation, which is tough and resistant, at the central portion of which is a mast of very fine grain hard composition the end of which functions in the manner of the keystone of an arch. The stem end of the nut is relatively flat and comprises the mesocarp formation which is amorphous and relatively soft. Babassu and similar nuts vary in the number of kernels; babassu nuts usually contain from four to six kernels, and in some quantity contain only three kernels.

Heretofore it has been attempted to crack babassu and similar nuts by nut cutting and cracking machines operating on the principle of engaging the nut at its stem end by means of radially related knives upon which the nut is placed and applying force by means of a vertically reciprocated head, usually provided with a central and closed-ended recess for receiving and engaging under pressure the blossom end of the nut, such pressure exerting head having a limited stroke. However, such procedure has not been successful, for the reason that the knives engage the structure of the nut, in a squeezing and wasteful cracking of the nut usually causing the crushing of the kernels. Further, such prior efforts have been unsuccessful for the reason that the pressure exerting head engaging the central mast of the blossom end of the nut, is ineffectual in aiding the splitting of the shell of the nut sought to be accomplished by the knives.

Pursuant to my invention, the babassu or similar nut is placed with its stem or flat end upon a set of radially related, spring biased, downwardly and centrally displaceable knives which are coordinated to stably support the relatively soft structure of the stem end of the nut. Such lower set of knives is mounted in a frame which is carried by the ram of a hydraulic power unit. Cooperating with such lower set of knives is an upper set of radially related, spring biased, upwardly and centrally displaceable knives which are mounted in a frame, which may be stationary, the upper frame being further provided with a conically or other convexly shaped head, preferably fixed in such frame, the head being provided with a substantially centrally disposed perforation and arranged upon operation of the hydraulic power unit raising the lower frame with the thereon supported nut toward the knives of the upper frame. Such movement is continued until the blossom end of the nut engages the edges of the upper set of knives peripherally about such end of the nut, the mast thereof approaching or then entering the perforation of the conical head. Upon further continued pressure operation of the hydraulic power unit, the knives of the upper set effectually enter peripherally about the upper end of the shell, initiating and eventually forcibly severing the mast end which operation under the required great force releases the severed mast end in an explosive manner, the separated mast end entering and finding exit through the perforation of the conical head.

The blossom end of the nut is composed of a large solid section of the hard endocarp center column or mast and a covering of mesocarp and pericarp resulting in a firm mass very difficult to split, whereas the stem end consists of a mass of fibers forming the bottom end of the center column and the pericarp presenting a relatively soft section relatively easy to split.

Desirably, a substantially uniform incising pressure is applied from stage to stage of cracking a nut by providing the number of severing knives of the lower set either equal or less, or greater, than that of the upper set; in the instance equal or less number of knives in the lower set their wedge formation is duller, i. e., of blunter wedge formation, whereas when a greater number of blades are provided for the lower set their wedge formation is substantially equal to that of the upper set of knives.

Pursuant to my method, the force afforded by the hydraulic power unit or equivalent is continuous through the successive stages of splitting the nut. By employing severing knives at both the stem and blossom ends of the nut, the shell is split longitudinally of the nut at mutually spaced incisions, effectually separating the split portions of the nut and substantially wholly without any crushing pressure upon the kernels, whereby the kernels are readily separated without further operation from the split portions of the nut shell.

After completion of the kernel freeing stage, the lower set of knives may be quickly lowered upon release of the pressure of the medium of the hydraulic power unit. Such combination of the hydraulic power unit with the shell splitting devices is also of advantage in that no adjustment is required for different sizes of nut, in that the ram of the hydraulic power unit is readily operated, upon placing any size of nut on its lower frame, to its initial stage of nut cracking. The central cone-shaped head serves the additional function, immediately succeeding the stage of release of the severed mast, of opening out the partially separated split portions of the shell to full separation.

By the employment of cutting knives of wedge formation having their cutting edges at an angle to the vertical, there is formed a pocket which is adequate to receive without adjustment nuts of varying sizes.

A hydraulic power unit is of especial advantage in that its power is continuous and increases upon increased resistance encountered in cracking of the nut.

A special objective of the invention is to provide a nut cracking appliance which is portable and at the same time capable of exerting great incising pressure in its nut cracking operation. These characteristics are of importance since many nuts, for example babassu nuts, are found in quantity in jungles, as in Brazil, or in forests and like remote locations where non-portable nut cracking machines are practically useless.

Further features and objectives of my invention will be more fully understood by the following detail description and the accompanying drawings, in which Fig. 1 is an elevational view, partly in central section of a preferred embodiment illustrating my apparatus for carrying out the same. In this view the babassu or similar nut is shown in position prior to the stage of cracking the same, the stem end of the nut resting upon the lower set of splitting knives, with the blossom end of the nut projecting upwardly toward the upper set of splitting knives.

Fig. 2 is an elevational view taken at right angles to that of Fig. 1, parts of the frame being omitted for clarity. This view illustrates the stage at which the nut is being subjected to the combined and cooperating splitting action of the upper and lower splitting knives.

Fig. 3 is a diagrammatic view of a central section of a babassu or similar nut indicating the general structure of the nut, particularly its relatively flat stem end and its relatively pointed and arched blossom end.

Fig. 4 is a diagrammatic view of a babassu or similar nut indicating generally the nature of the splitting action effected by my apparatus upon the body portion of the nut and particularly the segregation of the mast from such body portion at the stage of explosive severance and discharge of the mast therefrom.

Fig. 5 is an enlarged central section of the upper set of splitting knives and the mounting therefor Fig. 6 is a bottom plan view of Fig. 5, showing a preferred assembly and mounting of the upper set of splitting knives.

Fig. 7 is a central section, similar to Fig. 6, of the mounting and assembly for the upper set of splitting knives, such knives being omitted in this view for clarity; Fig. 7 particularly shows the central conical pressure head, provided with an axial opening for receiving the mast at an initial stage and affording a through passage and discharge for the mast after its explosive severance from the blossom end of the nut.

Fig. 8 illustrates a preferred formation of a knife of the upper set having a relatively sharp cutting edge, for engaging the blossom end of a nut.

Fig. 9 illustrates a preferred formation of a knife of the lower set, having a relatively dull cutting edge, for engaging the stem end of a nut.

Referring generally to the drawings illustrating a preferred procedure of cracking nuts pursuant to the invention, there are provided two sets of knives mounted for mutual approach under continuous power of a hydraulic power unit or equivalent. Conveniently such coordinated sets of knives are arranged in vertical relation in a suitable frame, the lower set supporting the stem or relatively flat end of the nut and displaceable upwardly under such continuous power movement.

More specifically, the drawings illustrate preferred embodiments which comprise a vertically extending frame 10, having the base 10a on which may be mounted a hydraulic power unit 11. 12 indicates the operating lever of such power unit; the ram of the power unit is indicated at 13; the release valve of the power unit is indicated at 14.

The frame 10 is provided with a cross-tie 10b, serving as a guide and sliding bearing for the ram 13. The head of the ram is pressure fitted with the central body of the lower knife frame.

Such power unit is preferably provided with a manually operated crank 15, for speedy preliminary setting, and similar withdrawing, of the ram, advantageous in initiating the stage of splitting the nut under power operation and correspondingly for withdrawing the ram after completion of the splitting operation, preparatory for splitting a succeeding nut, irrespective of size.

Specifically such crank 15 is shown pivotally connected to a pin bolt 16 extending through the indicated perforation passing diametrically through the ram 13, the crank 15 being fulcrumed to the frame 10 per the oppositely related links 17.

To the ram 13 is secured the lower knife frame 18 in which the radially related, stem end engaging and splitting knives 19 are mounted. Such frame 18 may have a generally circular formation and is constructed similar to the upper knife frame which is illustrated in greater detail and described in particulars hereinafter. Each knife 19, as appears in Figs. 1 and 2 and also in Fig. 9, is wedge-shaped having an end cutting face 19a the cutting edge 19b of which is arranged at an angle to the longitudinal axis of the body of the knife. The head 19c of each knife is of general spherical formation and loosely received within the annular upper bearing flange 18a of its mounting frame 18. Such bearing head 19c of each knife 19 has a bearing relation also against the inner face of the cylindrical wall 18b of the frame 18. The body portion of each blade 19 is received within and guided in its reciprocated arcuate movement by a slot 18f of the inner body portion of the frame 18. Each knife 19 also is provided with a partial-spherical bearing face 19d for receiving a correspondingly headed pressure bearing bolt 20 loosely positioned within a recess 18c within the central body of the frame 18. Each bolt 20 is biased toward its associated knife by an expansible spring 21 of pre-determined strength.

As illustrated in Figs. 1 and 2, the frame of the upper set of splitting knives may be stationary, as by securement to the upper cross-arm 22 of the frame 10. The upper knife frame is designated 23 and is provided with a set of radially related knives 24 having generally the formation and manner of mounting as hereinabove described with respect to the lower set of knives 19. The wedge-shaped face of each upper knife is indicated 24a, its end cutting edge 24b and its partial-spherical bearing head 24c. The body portion of each knife 24 is received within and guided in its reciprocated arcuate movement by slots 23f in the central body portion of the frame 23. The annular bearing flange of the upper frame is designated 23a and its cylindrical wall 23b.

The upper frame 23 is also provided with resiliently biasing pressure bearing bolts 25, each biased by an expansible spring 26 mounted within an indicated recess within the central body of the upper frame 23; however, the head of each bearing bolt 26 preferably engages the indicated socket of its associated splitting knife 24.

The upper frame 23 is provided with a substantially centrally disposed conical or other convexly configurated head 27, having a through perforation 28. The body of the frame 23 is cut away as indicated at 23c to afford communication with the perforation 28 and likewise the cross-arm 22 is cut away as indicated at 22a for similar communication, affording a discharge passage for the severed mast of the nut, as set forth more fully hereinafter.

The knives 19 and their associated parts of the lower frame 18 and the knives 24 of the upper frame 23 are assembled in any suitable manner to effect the desired functional relationship. A simple and effective arrangement of these respective assemblies is had by forming the frames 18 and 23 of split halves for the outer cylindrical wall 23b and the annular flange 23a, and securing the same to the central body portion 23 by means of securing bolts 29, as indicated in Figs. 6 and 7. The central conical head 27 may be secured in position by pressure fit within the indicated circular recess in the central body portion 23 of the upper knife frame.

As indicated in Fig. 6, there may be five knives 24 in the upper frame. It will be observed that the angular knife-edges 24b of the respective radially related knives approach one another substantially uniformly with respect to an imaginary axis passing through the center of the through-perforation 28 of the conical head 27.

Assuming now that a nut 30, as indicated in Figs. 1 and 2, is placed with its stem end 30a, see Fig. 3, upon the cutting edges 19b of the lower set of knives 19 so that the blossom end 30b of the nut 30 extends upwardly. Upon application of power as by means of the operating lever 12 of the hydraulic power unit 11, the lower frame 18 and therewith its set of cutting knives 19 are elevated, thus raising the nut 30 until its blossom end 30b passes within the zone bounded by the pointed knife edges of the respective knives 24 of the upper set. Upon engagement of the upper knives 24 peripherally about the blossom end of the nut and upon continued application of power exerted by the ram 13, the pointed knife edges of knives 24 enter the shell of the nut peripherally about its pointed end, until such pointed knife edges combine by their mutually approaching movement to segregate and sever the top end of the mast or central portion of the blossom end of the nut, whereupon the severed mast end is explosively released within the discharge passage 28 of the conical head 27. During this stage of segregation and severing of the mast end, the knife edges 19b of the radially related knives of the lower set will have initiated penetration within the relatively soft woody stem end of the nut, and immediately succeeding the stage of forcible release of the severed mast end the resulting reactive impacting force completes the penetration of the knife edges of the lower set of knives into the shell to effectually split the same longitudinally of the nut. The severing and release of the mast end through the perforation 28 of the conical head 27, gives rise to an opening at the blossom end of the nut, into which opening the conical formation of the head 27 is forced, and upon further continued upward movement of the ram afforded by the hydraulic power unit, combined with the splitting of the shell peripherally about the blossom or pointed end 30b of the nut, the head 27 serves the additional function of effecting a greater and greater opening-out of the shell until the split portions are completely forced apart and fall away, accompanied by the free dropping out of the kernels of the nut.

As appears from the foregoing, the procedure of cracking nuts pursuant to the invention affords a highly efficient manner of utilizing wedge knives to quickly and effectually split the shell and by the employment of a relatively lightweight machine for delivering great pressure applied most effectively upon the nut to be cracked, and without crushing the kernels.

In the several pressure-exerting stages, the respective spring-pressed bearing plungers 20 and 25 of the lower and upper knife assemblies afford resilient resistance of the knife edges with respect to the shell of the nut, in which function saw-like reciprocated strokes are imparted to the knife edges. These pressure plungers 20 and 25 also serve at the stages of more and more penetration of the respective knife edges as reacting pressure imparting sources, cooperating with the continuous pressure of the hydraulic or equivalent power source.

Fig. 3 indicated generally, in cross-section a nut of the babassu palm type, its stem end being indicated at 30a and its blossom end at 30b. Kernels are indicated at 30c. Fig. 4 represents diagrammatically the nut 30 at an approximate stage of being split into longitudinally extending portions indicated at 30d. 30e indicates the mast end at a stage after being severed and then explosively released under high pressure required to effectuate the "cracking" of the nut. As an indication of the problems involved, babassu nuts require a pressure of 6000 lbs. or upwardly.

In the cracking of nuts of the nature of babassu nuts having a center mast one end of which projects at the blossom end of the nut, by my device the mast end is incised, severed and removed, thus creating an opening in the shell of the nut at such end, concomitantly forcing outwardly the shell at such opening while splitting the body of the shell about its periphery and at its opposite ends, thereby outwardly forcing the severed portion of the shell, all without exerting crushing pressure upon the kernels, and affording a free separation of the kernels.

In the cracking of nuts of the nature of babassu nuts, upon incising and severing the mast end and outwardly forcing the shell at the thus created opening while splitting the body of the shell in direction toward such opening, the thus severed portions of the shell are stripped from the mast without substantial pressure upon the kernels.

With special reference to babassu and like nuts requiring great pressure to crack the same, commercial embodiments have been successfully developed to generate splitting pressure up to 8000 p. s. i., the weight of the machine being less than 200 pounds.

Whereas I have described my invention by reference to specific forms thereof, it will be understood that many changes and modifications may be made provided they do not depart from the scope of the claims.

I claim:

1. The combination of a power unit for cracking a nut or the like provided with a source of constant application of continuously increasing pressure, a set of radially related knives displaceable by the power imparting element of said power unit, a second set of radially related knives mounted in alignment with the path of displacement of said first named set of knives, and a curvedly configurated head disposed inwardly of said second named set of knives, said curvedly configurated head being provided with an unobstructed through-passage for receiving and discharging a relatively central part of the end of such nut or the like upon severance of the same by said second set of knives.

2. The combination of a power unit for cracking a nut or the like provided with a source of constant application of continuously increasing pressure, a set of spring-pressed radially related knives displaceable by the power imparting element of said power unit, a second set of radially related knives mounted in alignment with the path of displacement of said first named set of knives, and a curvedly configurated head disposed inwardly of said second named set of knives, said curvedly configurated head being provided with an unobstructed through-passage for freely receiving and discharging a relatively central part of the end of such nut or the like upon severance of the same by said second set of knives.

3. The combination of a power unit for cracking a nut or the like provided with a source of constant application of continuously increasing pressure, a set of radially related knives displaceable by the power imparting element of said power unit, a second set of spring-pressed radially related knives mounted in alignment with the path of displacement of said first named set of knives, and a curvedly configurated head disposed inwardly of said second named set of knives, said curvedly configurated head being provided with an unobstructed through-passage for freely receiving and discharging a relatively central part of the end of such nut or the like upon severance of the same by said second set of knives.

4. The combination of a power unit for cracking a nut or the like provided with a source of constant application of continuously increasing pressure, a set of spring-pressed radially related knives displaceable by the power imparting element of said power unit, a second set of spring-pressed radially related knives mounted in alignment with the path of displacement of said first named set of knives, and a curvedly configurated head disposed inwardly of said second named set of knives, said curvedly configurated head being provided with an unobstructed through-passage for receiving and discharging a relatively central part of the end of such nut or the like upon severance of the same by said second set of knives.

5. The combination of a power unit for cracking a nut or the like provided with a source of constant application of continuously increasing pressure, a set of radially related knives of end wedge formation displaceable by the power imparting element of said power unit, a second set of radially related knives mounted in alignment with the path of displacement of said first named set of knives, and a curvedly configurated head disposed inwardly of said second named set of knives, said curvedly configurated head being provided with an unobstructed through-passage for receiving and discharging a relatively central part of the end of such nut or the like upon severance of the same by said second set of knives.

6. The combination of a power unit for cracking a nut or the like provided with a source of constant application of continuously increasing pressure, a set of radially related knives displaceable by the power imparting element of said power unit, a second set of radially related knives of end wedge formation mounted in alignment with the path of displacement of said first named set of knives, and a curvedly configurated head disposed inwardly of said second named set of knives, said curvedly configurated head being provided with an unobstructed through-passage for freely receiving and discharging a relatively central part of the end of such nut or the like upon severance of the same by said second set of knives.

7. The combination of a power unit for cracking nuts or the like provided with a source of constant application of continuously increasing pressure, a set of radially related knives of end wedge formation displaceable by the power imparting element of said power unit, a set of radially related knives of end wedge formation loosely pivotally mounted in alignment with the path of displacement of said first named set of knives, and a curvedly configurated head disposed inwardly of said second named set of knives, said curvedly configurated head being provided with a through-passage for receiving and discharging a relatively central part of the end of such nut or the like upon severance of the same by said second named set of knives.

8. The combination of a hydraulic power unit for cracking nuts or the like, a set of radially related knives displaceable by the power imparting element of said power unit, a set of radially related knives loosely pivotally mounted in alignment with the path of displacement of said first named set of knives, means for resiliently biasing the knives of said second set in the directions of their paths of severing, and a curvedly configurated head disposed inwardly of said second named set of knives, said curvedly configurated head being provided with an unobstructed through-passage for receiving and discharging a relatively central part of the end of such nut or the like upon severance of the same by said second set of knives.

9. The combination of a hydraulic power unit for cracking nuts or the like, a set of spring-pressed radially related knives displaceable by the power imparting element of said power unit, a set of radially related knives loosely pivotally mounted in alignment with the path of displacement of said first named set of knives, means for individually resiliently biasing the knives of said second set in individual directions of their paths of severing, and a curvedly configurated head disposed inwardly of said second named set of knives, said curvedly configurated head being provided with an unobstructed through-passage for receiving and discharging a relatively central part of the end of such nut or the like upon severance of the same by said second set of knives.

10. The combination of a hydraulic power unit for cracking nuts or the like, a set of radially related knives displaceable by the power imparting element of said power unit, a set of spring-pressed radially related knives loosely pivotally mounted in alignment with the path of displacement of said first named set of knives, means for individually resiliently biasing the knives of said second set in individual directions of their paths of severing and a curvedly configurated head disposed inwardly of said second named set of knives, said curvedly configurated head being provided with an unobstructed through-passage for receiving and discharging a relatively central part of the end of such nut or the like upon severance of the same by said second set of knives.

11. The combination of a hydraulic power unit for cracking nuts or the like, a set of spring-pressed radially related knives displaceable by the power imparting element of said power unit, a set of spring-pressed radially related knives loosely pivotally mounted in alignment with the path of displacement of said first named set of knives, means for individually resiliently biasing the knives of said second set in individual directions of their paths of severing and a curvedly configurated head disposed inwardly of said second named set of knives, said curvedly configurated head being provided with an unobstructed through-passage for receiving and discharging a relatively central part of the end of such nut or the like upon severance of the same by said second set of knives.

12. The combination of a hydraulic power unit for cracking nuts or the like, a set of radially related knives of end wedge formation displaceable by the power imparting element of said power unit, a set of radially related knives loosely pivotally mounted in alignment with the path of displacement of said first named set of knives, means for individually resiliently biasing the knives of said second set in individual directions of their paths of severing and a curvedly configurated head disposed inwardly of said second named set of knives, said curvedly configurated head being provided with an unobstructed through-passage for receiving and discharging a relatively central part of the end of such nut or the like upon severance of the same by said second set of knives.

WILLIAM F. GRUPE.